United States Patent Office 3,552,944
Patented Jan. 5, 1971

3,552,944
PRODUCTION OF PHOSPHATE FERTILIZERS
Ulrich Hauschild and Joachim Massonne, Hannover, and Hans Werner Schmidt, Isernhagen Niederhagener Bauerschaft, Germany, assignors to Kali-Chemie Aktiengesellschaft, Hannover, Germany
No Drawing. Filed Nov. 6, 1967, Ser. No. 680,976
Claims priority, application Germany, Nov. 9, 1966, K 60,666; Apr. 12, 1967, K 61,972
Int. Cl. C05b 13/06
U.S. Cl. 71—33
10 Claims

ABSTRACT OF THE DISCLOSURE

Raw phosphate is granulated with silica, an aqueous alkali metal hydroxide solution, and 10 to 70 percent, calculated on the total mixture, of the end product as obtained in the process, preferably in hot condition and/or in the presence of the hot carbon dioxide containing waste gases of a rotary kiln, and the granulated mixture is calcined in a rotary kiln.

---

The invention relates to the production of calcined phosphates which are suitable as fertilizers.

As disclosed e.g. in Pat. No. 1,799,882, such phosphate fertilizers can be prepared by calcining a mixture of natural raw calcium phosphate and an alkali metal carbonate, particularly sodium carbonate, at a temperature in the range of 1100 to 1300° C. In the decomposition of raw phosphates which have a low silica content, the amount of silica required to remove the excess CaO is admixed in form of sand. The proportions of the components in the calcination mixture are adjusted to at least 1 mole of alkali metal oxide per 1 mole of $P_2O_5$. The addition of silica is so adjusted as to ensure that, by combination with 1 mole of CaO from the tricalcium phosphate present in the starting material and with the lime not combined with phosphoric acid, calcium orthosilicate can be formed.

If it is desired to obtain a calined phosphate having a $P_2O_5$ solubility in Petermann citrate solution of more than 90%, the molar ratio of alkali metal oxide to phosphate ($Me_2O:P_2O_5$) in the mixture should be about 1.2 to 2:1. However, calcined phosphates suitable as fertilizers can still be obtained with molar ratios of $Me_2O:P_2O_5$ down to 0.6:1. The proportion of $P_2O_5$ which is soluble in Petermann citrate solution is then smaller but the products have still a high $P_2O_5$ solubility in citric acid solution.

It has also been proposed to replace the alkali metal carbonates by the respective alkali metal hydroxides. For economic and technological reasons, this method has not been adopted for commercial production. If a mixture of raw phosphate, solid alkali metal hydroxide, and sand is charged into a hot rotary kiln, the mixture cakes to lumps already during charging so as to prevent a homogeneous decomposition of the raw phosphate. In addition, the alkali metal hydroxide attacks and corrodes the oven walls and there are considerable losses of the alkali metal hydroxides, particularly of potassium hydroxide, due to their volatility.

It is a principal object of the invention to provide an economic process for the calcination of raw phosphates with alkali metal hydroxides.

Other objects and advantages will be apparent from a consideration of the specification and claims.

According to the invention, a granulated mixture is prepared from raw phosphate, an aqueous solution containing 40 to 75 percent by weight of alkali metal hydroxide, silica, and about 10 to 70 percent by weight, calculated on the total mixture, of calcined end product; said mixture is then calcined in a directly heated rotary kiln to a maximum temperature in the range of 950 to 1300° C. Sodium hydroxide or potassium hydroxide solutions, as well as mixtures thereof, can be employed. In the mixture, the molar ratio of $P_2O_5$ to $Me_2O$ must be adjusted to 1:0.6 to 1:1.5, preferably to a value between 1:1 and 1:1.4. Silica must be added in such an amount that the molar ratio of $P_2O_5:SiO_2$ is between 1:0.1 and 1:0.9, preferably between 1:0.6 and 1:0.8.

If only aqueous alkali metal hydroxide solution is added to natural calcium phosphate, e.g., fluoroapatite, in the amount required for the decomposition, e.g., as 50% by weight solution, a relatively fluid mixture is obtained. If such mixture is fed into the reactor, which may be a directly heated rotary kiln, part of the water is evaporated and the alkali metal hydroxide is converted by the hot carbon dioxide containing waste gases of the kiln to alkali metal carbonate; in the course of these reactions, the mixture passes in the upper part of the kiln a phase where it tends to adhering to the kiln walls and to caking. During this period, the mixture behaves like the mixture of raw phosphate and solid alkali metal hydroxide.

These difficulties which we observed in our investigations, can be obviated by adding to the starting mixture of raw phosphate and concentrated aqueous alkali metal hydroxide solution, finished calcined phosphate end product from a previous production, in granulated or powdered form. In the following, we will call this kind of addition, for the sake of brevity, simply end product. The amount of such added end product will depend on the concentration of the alkali metal hydroxide solution, on the size of the particles of the raw phosphate and end product, and on the type of granulation process used. It may be of advantage to use as added end product only the fines and oversize grains of a previous production. The oversize grains may be disintegrated to a certain size gradation. We prefer to use grain sizes up to 20 mm.

In order to granulate the product, the mixture of raw phosphate and alkali metal hydroxide solution is sprayed, in a suitable mixing device such as in a rotary or granulating drum, an end product or otherwise mixed therewith. At the same time, silica in form of sand is added in the required amount to said mixture. In this way, 40 to 75, preferably 50 to 70 percent by weight aqueous alkali metal hydroxide solutions can be worked up with 15 to 70 percent by weight, calculated on the total mixture, of end product to grains suitable for the calcination process.

We found it of particular advantage to mix a preferably hot mixture of the raw phosphate and alkali metal hydroxide solution with part of the still hot end product as it comes from the kiln. Simultaneously with the granulation, the aqueous alkali metal hydroxide solution is concentrated to an extent which depends on the temperature of the end product, which temperature may be up to 1000° C. When operating in this manner, a free flowing granular mixture of sufficient hardness can be obtained with smaller amounts of end product than are required if the reaction components are mixed at lower temperatures. The savings can be up to 60 or 70 percent of the amount of end product which would have to be employed when cooled to room temperature. The required amount of end product is between about 20 to 60 percent by weight, calculated on the total raw product mixture; thereby, the required amount of end product is the smaller the higher the temperatures of the starting components when mixed and the more concentrated the alkali metal hydroxide solution.

By addition of end product to mixtures of raw phosphate and concentrated alkali metal hydroxide solutions to be calcined, granulated products can be obtained which are resistant enough to exclude harmful lump formation in the kiln. This effect could not be expected. For instance, if very high concentrated alkali metal hydroxide solutions are mixed with raw phosphates, there are also obtained granulated products; said products, however, soften at the calcination temperatures and form lumps. We assume that the improvement of the grains produced by addition of the end product is due to its water-absorptive capacity and to its chemical resistance.

Products which are suitable for the calcination process can be obtained also by admixing to the raw phosphate-alkali metal hydroxide solution mixture end products only in such an amount as to produce relatively soft grains and by drying said grains at temperatures in the range of 150 to 300° C. The drying can be performed, e.g., in a directly or indirectly heated rotary tube placed in front of the rotary kiln proper. The waste gases of the kiln can be used for such drying operation.

It is of particular advantage for the granulation to mix intensively the raw material components raw phosphate, concentrated alkali metal hydroxide solution, silica, and end product in a suitable mixing device while passing therethrough the hot carbon dioxide containing waste gases of the kiln in which the phosphate is decomposed. The treatment with said hot waste gases which have a temperature of about 350 to 650° C. increases the evaporation of water. Therefore, it is not necessary to employ aqueous alkali metal hydroxide solutions which contain more than 65 percent by weight of alkali metal hydroxide. Our process is economic already with aqueous solutions which contain 40 to 50 percent by weight of alkali metal hydroxide. Granulates which are suitable for calcination can be obtained without difficulty with 10 to 40 percent by weight of end product, calculated on the total raw starting material mixture. In addition to the predrying by expulsion of water, there takes place also a partial carbonation of the aqueous alkali metal hydroxide solutions. It is particularly advantageous that the small amounts of alkali metal compounds which vaporize in the kiln, are absorbed by the alkali metal hydroxide solutions; this prevents particularly losses of the volatile potassium hydroxide. At the same time, the dust particles are substantially deposited and the harmful combustion gases are absorbed, which may eliminate the need for an additional mechanical or other purification of the waste gases. The partial carbonation and the particles absorbed from the oven waste gases have the additional effect to reduce the tendency of the grains to form rings on the walls of the kiln.

The granulate obtained according to the invention is readily decomposed by calcining at temperatures between 950 and 1300° C. in a directly heated rotary kiln equipped with a basic lining. When a sodium hydroxide solution is used, the decomposition temperatures are preferably 1100 to 1250° C., for potassium hydroxide solutions preferably 1000 to 1150° C. The process can be carried out as a batch process or continuously and is suitable to convert natural calcuim phosphates of different origin such as Kola apatite concentrates, Florida phosphate, Curacao phosphate, and others into calcined phosphates.

Said calcined phosphates constitute valuable fertilizers. The calcined potassium phosphates possess with a combined 50% $P_2O_5$+$K_2O$ content a very high nutrient value. As, in addition, the calcium is present in basically efficient form, said fertilizers are particularly suitable for lime deficient soils. The $P_2O_5$ is present in substantially completely available form.

The alkali is water-soluble only to a more or less small extent. The favorable behavior of the thus prepared potassium-phosphate fertilizers should be particularly emphasized. The water-soluble $K_2O$ portion is about 15 to 20% of the total $K_2O$. Only while the $P_2O_5$ is taken up by the soil or the plants, the residual $K_2O$ is simultaneously slowly dissolved; in this way, we obtain a longer fertilizing effect of the potassium compared with conventional potassium fertilizers, which are more readily soluble. The phosphates are easy to grind and can be converted with little water to hard abrasion-resistant grains. An addition of potassium salts can modify the $K_2O$ content of the calcined phosphate fertilizers within wide limits.

The following examples illustrate the invention.

In all examples, the calcination was carried out in a directly heated rotary kiln which had a basic lining.

EXAMPLE 1

1000 kg. of raw phosphate containing 37.4% by weight of $P_2O_5$ were mixed with 80 kg. of sand and 830 kg. of hot aqueous potassium hydroxide solution (50% by weight of KOH). In an Eirich mixer, the still hot mixture was mixed with 3400 kg. of end product. The thus obtained mixture was calcined to an end temperature of 1100° C. The produced calcination product had a $P_2O_5$ content of 25.6% by weight and a $K_2O$ content of 23 to 25% by weight. The $P_2O_5$ was 98.1% soluble in Petermann citrate solution.

EXAMPLE 2

1000 kg. of raw phosphate containing 37.4% by weight of $P_2O_5$ were mixed with 80 kg. of sand and 690 kg. of hot aqueous potassium hydroxide solution (60% by weight KOH). 2000 kg. of end product were mixed into the still hot mixture in an Eirich mixer. The thus obtained granulated product was calcined up to an end temperature of 1100° C. The readily ground end product contained by weight 26.1% of $P_2O_5$ and 23 to 25% of $K_2O$. The $P_2O_5$ was 93.9% soluble in Petermann citrate solution.

EXAMPLE 3

1000 kg. of raw phosphate containing 37.4% by weight of $P_2O_5$ were mixed with 80 kg. of sand and 600 kg. of an aqueous potassium hydroxide solution containing 70 percent by weight of KOH. 1260 kg. of end product were then incorporated in an Eirich mixer into the still hot mixture. The thus produced granular product was heated to an end temperature of 1100° C. The end product contained by weight 26.5% of $P_2O_5$ and 24.1% of $K_2O$. The solubility of the $P_2O_5$ in Petermann citrate solution was 95.5%.

EXAMPLE 4

1000 kg. of raw phosphate containing 38 percent by weight of $P_2O_5$ were mixed with 840 kg. of a hot aqueous potassium hydroxide solution (50% by weight of KOH). The obtained thin slurry was applied in a mixing drum to 700 kg. of hot end product. The obtained free flowing mixture was charged into a rotary kiln and heated to an end temperature of about 1100° C. The produced end product was porous and suitable for grinding. It contained by weight 27.5% of $P_2O_5$ and 24.7% $K_2O$. More than 94% of the $P_2O_5$ were soluble in Petermann citrate solution.

EXAMPLE 5

1000 kg. of raw phosphate containing 37.4 percent by weight of $P_2O_5$ were mixed with 80 kg. of sand and 423 kg. of a hot aqueous sodium hydroxide solution containing 70 percent by weight of NaOH. In an Eirich mixer, said still hot mixture was mixed with 450 kg. of end product, and the obtained granular mixture was dried at about 300° C. in a rotary tube. The thus obtained product was calcined up to a temperature of 1150° C. The end product was easily grindable and contained 28.1 percent by weight of $P_2O_5$. 94.1% of the $P_2O_5$ was soluble in Petermann citrate solution.

EXAMPLE 6

1000 kg. of raw phosphate containing 37.4 percent by weight of $P_2O_5$ were mixed with 80 kg. of sand and 840 kg. of an aqueous potassium hydroxide solution (50% by weight of KOH). The produced thin slurry was gradually sprayed on 450 kg. of end product in a rotating mixing drum. Simultaneously, the waste gases of the rotary kiln in which the calcination took place, and which had a temperature of about 400° C. and contained carbon dioxide, were passed through the mixture. The thus obtained free flowing granular product was continuously transferred from the mixing drum to the rotary kiln where it was calcined to an end temperature of 1130° C. The end product was porous and readily grindable. It contained 27.5 percent by weight of $P_2O_5$ and 24.7 percent by weight of $K_2O$. More than 94% of the $P_2O_5$ were soluble in Petermann citrate solution.

Beginning the process, an end product, prepared by a known process and having the desired composition and structure is employed. The calcination is carried out continuously in a rotary kiln which must be long enough to provide for a preheating zone and the calcination zone proper and in which the charge fed at one end is heated by the flame and combustion gases of a burner arranged at the discharge end and burning gas, coal dust or preferably oil. The flame gases heat the reaction mixture in the calcining zone to a maximum temperature in the range of 950 to 1300° C. and are then passed in countercurrent to the charge which is preheated in a preheating zone of the kiln, and are used if required for the carbonation and granulation of the starting mixture as described hereinabove. The total residence time of the charge in the kiln is about 1 to 1.5 hours, and the calcination proper requires about 15 minutes.

We claim:

1. A process for the production of phosphate fertilizers by calcination of natural calcium phosphate comprising preparing a granulated mixture of said calcium phosphate, an aqueous alkali metal hydroxide solution containing 40 to 75 percent by weight of alkali metal hydroxide, silica and calcined end product, said mixture containing $P_2O_5$ and alkali metal oxide in a molar proportion of 1:0.6 to 1:1.5 and $P_2O_5$ and silica in a molar proportion of 1:0.1 to 1:0.9, said calcined end product being present in an amount of 10 to 70 percent by weight of the total mixture, and calcining said granulated mixture in a directly heated rotary kiln to a maximum temperature of 950 to 1300° C., thereby obtaining said calcined end product.

2. The process as claimed in claim 1 comprising the step of drying said granulated mixture, prior to calcination, at a temperature of 150 to 300° C.

3. The process as claimed in claim 1 wherein said calcined end product is used without substantial cooling directly for said granulated mixture.

4. The process as claimed in claim 3 wherein the amount of said calcined end product present in said mixture is 20 to 60 percent by weight.

5. The process as claimed in claim 3 comprising the step of drying said granulated mixture, prior to calcination, at a temperature of 150 to 300° C.

6. The process as claimed in claim 2 wherein the granulated mixture, prior to calcination, is dried with the hot carbon dioxide containing gases of the rotary kiln.

7. The process as claimed in claim 1 wherein the raw material components natural calcium phosphate, an aqueous alkali metal hydroxide solution containing 40 to 65 percent by weight of alkali hydroxide, silica and calcined end product being present in an amount of 10 to 40 percent by weight of the total mixture is mixed intensively while passing therethrough the hot carbon dioxide containing waste gases of the rotary kiln in which the phosphate is calcined.

8. The process as claimed in claim 1 wherein alkali metal hydroxide is a member of the group consisting of sodium hydroxide, potassium hydroxide, and mixtures thereof.

9. The process as claimed in claim 8 wherein the alkali metal hydroxide is sodium hydroxide and said maximum calcination temperature is 1100 to 1250° C.

10. The process as claimed in claim 8 wherein the alkali metal hydroxide is potassium hydroxide and said maximum calcination temperature is 1000 to 1150° C.

References Cited

UNITED STATES PATENTS

| | | | |
|---|---|---|---|
| 931,846 | 8/1909 | Connor | 71—42 |
| 2,963,359 | 12/1960 | Moore et al. | 71—64DA |
| 2,978,312 | 4/1961 | Seymour | 71—33 |
| 3,177,062 | 4/1965 | Hignett et al. | 71—33 |

FOREIGN PATENTS

| | | | |
|---|---|---|---|
| 17,393 | 7/1963 | Japan | 71—33 |

REUBEN FRIEDMAN, Primary Examiner

C. N. HART, Assistant Examiner

U.S. Cl. X.R.

71—45, 64